United States Patent [19]

Bühler et al.

[11] 4,215,042
[45] Jul. 29, 1980

[54] COPPER, AND NICKEL COMPLEXES OF AZO DYESTUFFS

[75] Inventors: Arthur Bühler, Rheinfelden; Hans U. Schütz, Basel, both of Switzerland

[73] Assignee: Ciba-Geigy Corporation, Ardsley, N.Y.

[21] Appl. No.: 904,358

[22] Filed: May 9, 1978

Related U.S. Application Data

[63] Continuation of Ser. No. 589,963, Jun. 24, 1975, abandoned.

[30] Foreign Application Priority Data

Jul. 16, 1974 [CH] Switzerland .......................... 9764/74
May 27, 1975 [CH] Switzerland .......................... 6750/75

[51] Int. Cl.² .................................................. C09B 45/14
[52] U.S. Cl. ....................................... 260/151; 260/149
[58] Field of Search .................................. 260/151, 149

[56] References Cited

U.S. PATENT DOCUMENTS

| | | | |
|---|---|---|---|
| 2,317,733 | 4/1943 | Conzetti et al. | 260/151 X |
| 2,602,080 | 7/1952 | Grimmel et al. | 260/151 |
| 2,897,189 | 7/1959 | Fasciati | 260/151 X |
| 2,897,190 | 7/1959 | Fasciati | 260/151 X |
| 2,970,137 | 1/1961 | Whitlock | 260/151 X |
| 3,040,019 | 6/1962 | Neier | 260/151 X |
| 3,268,505 | 8/1966 | Schundeautte | 260/151 X |
| 4,058,515 | 11/1977 | Stingl et al. | 260/151 |

FOREIGN PATENT DOCUMENTS

| | | | |
|---|---|---|---|
| 340284 | 9/1959 | Switzerland | 260/151 |
| 384108 | 1/1965 | Switzerland | 260/151 |
| 1029435 | 5/1966 | United Kingdom | 260/151 |

*Primary Examiner*—Helen M. S. Sneed
*Attorney, Agent, or Firm*—Michael W. Glynn; Edward McC. Roberts

[57] ABSTRACT

The present invention relates to copper and nickel complexes of the formula

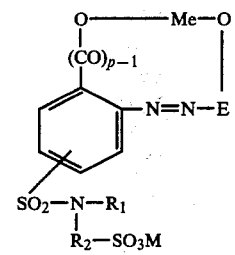

wherein
Me is copper or nickel;
p is 1 or 2;
E is the radical of a napthol or a phenol;
$R_1$ is hydrogen or lower alkyl;
$R_2$ is alkylene or arylene; and
M is hydrogen, an alkali metal or ammonium.

These dyes are suitable for dyeing and printing natural or synthetic polyamide materials; the dyeings obtained being characterized by their purity, depth, brilliance of shade, levelness and fastness properties.

5 Claims, No Drawings

COPPER, AND NICKEL COMPLEXES OF AZO DYESTUFFS

This is a continuation of application Ser. No. 589,963 filed on June 24, 1975 and now abandoned.

The present invention provides copper, nickel, chromium and cobalt complexes of azo or azomethine dyes of the formula

wherein D is a radical of the benzene or naphthalene class, X is a nitrogen atom or the CH group, Y is the OH, OCH₃ or COCH group, Y' is the OH group, the OCH₃ group or is an amino group, but Y and Y' may not both be the methoxy group, and wherein E, if X is a nitrogen atom, is the radical of a coupling component of the phenol, naphthol or naphthylamine class, of the 5-hydroxy-pyrazole, 5-aminopyrazole, acetoacetanilide, 2,4-dioxyquinoline or 6-hydroxy-pyridone class or is the radical of a 2,4-diamino-5-cyano- or -5-carbonamidopyridine which carries in 6-position a substituted or an unsubstituted amino, alkoxy, aryloxy, alkylmercapto or arylmercapto group, and, if X is the methine group, Z is the radical of a o-hydroxybenzaldehyde or o-hydroxy-naphthaldehyde, and wherein one of the radicals D or E contains a group of the formula

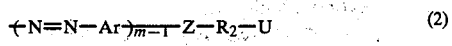

wherein Z is a bridge member of the formula

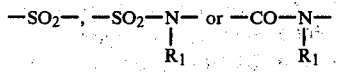

wherein R₁ is hydrogen or a low molecular alkyl group, R₂ is a low molecular alkylene radical or an arylene radical, Ar is an arylene radical, m is 1 or 2 and U is a sulpho or carboxy group, and wherein D and E, besides carrying this group, can carry the customary non-ionogenic substituents which do not impart solubility in water and together can carry at most one additional sulpho group.

The sulpho and carboxy groups can of course also be in ionised form, e.g. as alkali or ammonium sulphonates or carboxylates. For the sake of simplicity, however, the dyes will always be described herein in the form of the free acids.

These complexes are manufactured by reacting an azo or azomethine compound of the formula (1) in the ratio 1:1 with copper, nickel or chromium donors or in the ratio 1:2 with chrommium or cobalt donors.

Y is above all the hydroxy or carboxy group and Y' is also preferably hydroxy. If Y' is an amino group, it is primarily the NH₂ or a low molecular NH-alkyl group. The term "low molecular" denotes herein radicals of 1 to 4 carbon atoms.

The term "arylene" denotes substituted or unsubstituted naphthylene and especially phenylene radicals. Examples of suitable substituents thereof are halogen atoms, in particular chlorine, and low molecular alkyl and alkoxy groups, such as methyl and methoxy, R₂ in the significance of an arylene radical is preferably phenylene.

The present invention provides above all the copper and nickel complexes of azo dyes of the formula

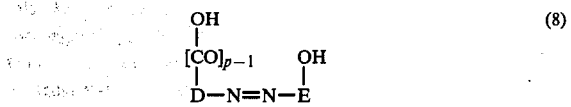

wherein p is 1 or 2 and D and E have the meanings previously assigned to them and wherein the radical of the formula (2) is bonded to the diazo component D.

The azo and azomethine compounds of the formulae (1) and (8) are obtained in known manner by coupling or condensation of an amine with an aldehyde.

The radical D is derived from an aminophenol or aminonaphthol or from the corresponding methoxy compounds or from an anthranilic acid, and, besides the group of the formula (2), can carry in addition one or two of the following substituents: chlorine, bromine, nitro, trifluoromethyl, low molecular alkyl and low molecular alkoxy.

Suitable aromatic amines from which D is derived are:

2-amino-1-hydroxybenzene-4- or -5-(N-(o-sulphophenyl)-sulphonamide
2-amino-1-carboxybenzene-4- or -5-(N-(p-sulphophenyl)-sulphonamide
2-amino-1-hydroxybenzene-5-N-methyl-N-(p-sulphophenyl)-sulphonamide
2-amino-1-methoxybenzene-4-N-(m-sulphophenyl)-sulphonamide
4-nitro- or 4-chloro-2-amino-1-hydroxybenzene-5-N-(β-sulphoethyl)-sulphonamide
6-chloro-2-amino-1-hydroxybenzene-4-N-(γ-sulphopropyl)-sulphonamide
6- or 5-nitro-2-amino-1-hydroxybenzene-4-N-(sulphomethyl)-sulphonamide
1-amino-2-hydroxynaphthalene-6-N-(p-sulphophenyl)-sulphonamide
1-amino-2-methoxynaphthalene-6-N-(p-sulphophenyl)-sulphonamide
2-amino-1-hydroxynaphthalene-3-N-(β-sulphoethyl)-sulphonamide
2-amino-1-hydroxynaphthalene-4-N-(β-sulphoethyl)-sulphonamide
2-amino-1-hydroxynphthalene-6-N-(o-sulphophenyl)-sulphonamide
2-amino-1-carboxybenzene-4- or -5-(o-carboxyphenyl)-sulphonamide
2-amino-1-hydroxybenzene-4-N-(o-carboxyphenyl)-sulphonamide
2-amino-1-hydroxybenzene-5-(o-sulphophenyl)-sulphone.

If the coupling component contains the group of the formula (2), then suitable diazo components are also e.g. the following amines:
anthranilic acid
3- or 5-chloroanthranilic acid
2-amino-1-methoxybenzene
4-chloro- and 4,6-dichloro-2-amino-1-hydroxybenzene
4- or 5-nitro-2-amino-1-hydroxybenzene
4-methoxy-2-amino-1-hydroxybenzene
4-methyl-2-amino-1-hydroxybenzene The radical E can be derived from the following groups of coupling components:

1- or 2-naphthols which are substituted by chlorine, bromine, acylamino, low molecular alkyl, low molecular alkoxy and sulpho groups or are unsubstituted; phenols which are substituted by low molecular dialkylamino groups, by acylamino groups and by alkyl groups of 1 to 5 carbon atoms, and which couple in ortho-position; 2,6-dihydroxy-3-cyano- or 2,6-dihydroxy-3-carbonamido-4-alkylpyridines and 6-hydroxy-2-pyridones which are substituted in 1-position by low molecular, substituted or unsubstituted alkyl, e.g. methyl, isopropyl, β-hydroxyethyl, β-aminoethyl, γ-isopropoxypropyl or by —$NH_2$ or a substituted amino group, e.g. dimethylamino or diethylamino, and which carry in 3-position a cyano or carbonamido group and in 4-position a low molecular alkyl group, especially methyl; 5-pyrazolones or 5-aminopyrazolones which have in 1-position a phenyl or naphthyl radical which is substituted by chlorine, nitro, low molecular alkyl and alkoxy groups or is unsubstituted; acetoacetic anilides which are substituted in the anilide nucleus by low molecular alkyl and alkoxy groups, sulphonic acid groups and halogen, especially chlorine, or are unsubstituted; 2,4-diamino-5-carbonamido-pyridines or 2,4-diamino-5-cyano-pyridines which carry in 6-position a substituted or an unsubstituted amino group, e.g. a phenylamino, sulphophenylamino, pyrrolidino, piperidino, morpholino group or a low molecular alkyl or dialkylamino group.

The term "acylamino" denotes herein amino groups which are substituted by acyl radicals of aliphatic or aromatic sulphonic and, in particular, carboxylic acids or of carbonic acid monoalkyl or monoaryl esters. The term "acyl" therefore encompasses low molecular alkanoyl, alkoxycarbonyl and alkylsulphonyl groups, such as the acetyl, chloroacetyl, propionyl, butyryl, methoxycarbonyl, ethoxycarbonyl, methylsulphonyl or ethylsulphonyl groups, as well as aroyl, aryloxycarbonyl and arylsulphonyl groups, e.g. the benzoyl, chlorobenzoyl, methylbenzoyl, nitrobenzoyl, phenoxycarbonyl, phenylsulphonyl or p-methylsulphonyl group. Preferred acylamino groups are low molecular alkanoylamino, alkoxycarbonylamino or unsubstituted or substituted benzoylamino groups.

Examples of suitable coupling components are:
2-naphthol
1-acetylamino-7-naphthol,
1-propionylamino-7-naphthol,
1-carbomethoxyamino-7-naphthol,
1-carboethoxyamino-7-naphthol,
1-carbopropoxy-amino-7-naphthol,
1-dimethylaminosulphonyl-amino-7-naphthol,
1-naphthol,
5-chloro-1-naphthol,
5,8-dichloro-1-naphthol,
resorcinol,
1-naphthol-3-, -4-, or -5-sulphonic acid,
2-naphthol-3-, -4-, -5-, -6-, -7- or -8-sulphonic acid,
2-naphthol-3-N-(o-sulphophenyl)-carbonamide,
2-naphthol-6-N-(p-sulphophenyl)-sulphonamide,
4-methylphenol,
3-dialkylaminophenol, especially 3-dimethylamino- and 3-diethylaminophenol,
4-t-butylphenol,
4-t-amylphenol,
2- or 3-acetylamino-4-methylphenol,
2-methoxycarbonylamino-4-methylphenol,
2-ethoxycarbonylamino-4-methylphenol,
3,4-dimethylphenol and 2,4-dimethylphenol,
2,6-dihydroxy-3-cyano-4-methylpyridine,
1-methyl-3-cyano-4-ethyl-6-hydroxypyridone-(2),
1-ethyl-3-cyano-4-methyl-6-hydroxypyridione-(2),
1-phenyl-3-carbonamido-4-methyl-6-hydroxypyridone-(2),
1,3-dimethylpyrazolone, pyrazolimine,
1-phenyl-3-methyl-5-pyrazolone,
1-(2'-, 3'- or 4'-methylphenyl)-3-methyl-5-pyrazolone,
1-(2'-methoxyphenyl)-3-methyl-5-pyrazolone,
1-(2'-, 3'- or 4'-chlorophenyl)-3-methyl-5-pyrazolone,
1-(2'-, 3'- or 4'-nitrophenyl)-3-methyl-5-pyrazolone,
1-(2'-, 5'- or 3', 4'-dichlorophenyl)-3-methyl-5-pyrazolone,
1-(2'- 3'- or 4'-sulphophenyl)-3-methyl-5-pyrazolone,
acetoacetic anilide
acetoacetic-o-anisidide,
acetoacetic-o-toluidide,
acetoacetic-o-chloroanilide,
acetoacetic anilide-3- or -4-sulphonic acid,
acetoacetic-m-xylidide,
2,4-dioxyquinoline,
2,4-diamino-5-cyano-6-piperidino-pyridine,
2,4-diamino-5-cyano-6-phenylamino-pyridine.

The azomethine dyes of the formula (1) are manufactured by condensing in known manner the aromatic amines listed hereinbefore from which the radical D is derived with o-hydroxybenzaldehydes or o-hydroxynaphthaldehydes.

Examples of suitable aldehydes are:
2-hydroxybenzaldehyde,
3- and 5-methyl-2-hydroxybenzaldehyde,
3,5- and 3,6-dimethyl-2-hydroxybenzaldehyde,
3-methyl-5-tert.-butyl-2-hydroxybenzaldehyde,
5-chloro- or -bromo-2-hydroxybenzaldehyde,
3- and 4-chloro-2-hydroxybenzaldehyde,
3,5-dichloro-2-hydroxybenzaldehyde,
3-chloro-5-methyl-2-hydroxybenzaldehyde,
3-methyl-5-chloro-2-hydroxybenzaldehyde,
3- and 4- and 5-nitro-2-hydroxybenzaldehyde
3,5-dinitro- and 4-chloro-5-nitro-2-hydroxybenzaldehyde,
4-methoxy-2-hydroxybenzaldehyde,
1-hydroxy-2-naphthaldehyde and the derivative thereof which is chlorinated in 4-position; and 2-hydroxy-1-naphthaldehyde.

Among the copper complexes of azo dyes of the formula (8), importance attaches above all to those of the formula

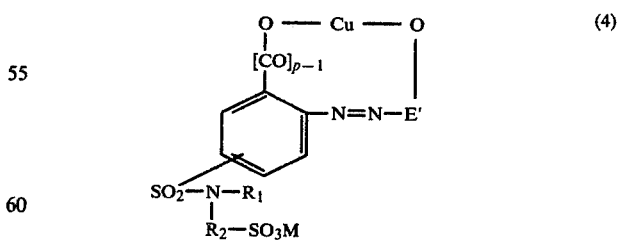

(4)

wherein p, $R_1$, $R_2$ and M have the meanings already assigned to them and E' is the radical of a naphthol which is substituted by chlorine, bromine, acylamino, sulpho, low molecular alkyl and alkoxy or is unsubstituted, the radical of a phenol which is substituted by low molecular dialkylamino groups, alkylamino groups or alkyl of 1 to 5 carbon atoms, the radical of a 1-aryl-3-methyl-5-pyrazolone, a 3-cyano- or 3-carbonamido-4-methyl-6-hydroxy-pyridone-2, a 2,4-diamino-5-cyanopyridine or 2,4-diamino-5-carbonamidopyridine or of an acetoacetic anilide.

Preferably p is 1 and $R_1$ is hydrogen or methyl. The following compounds are to be singled out for special mention as important coupling components from which E' is derived:
naphthols of the formulae

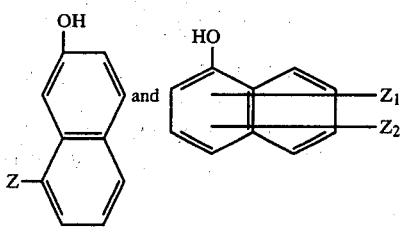

wherein Z is a hydrogen atom or an acylamino group and each of $Z_1$ and $Z_2$ is independently hydrogen or chlorine, or wherein $Z_1$ is a hydrogen atom and $Z_2$ is a sulpho group;
pyridones of the formula

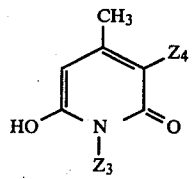

wherein $Z_3$ is an alkyl radical of 1 to 4 carbon atoms which is substituted by OH, $NH_2$ or a low molecular alkoxy group or is unsubstituted and $Z_4$ is the CN or the CONH group.

The novel metal complexes are manufactured by methods which are known per se in an aqueous or organic mediun. Copper, nickel, chromium and cobalt salts, e.g. copper sulphate, copper nitrate, nickel sulphate, chromium(III) chloride, cobalt sulphate and cobalt acetate are used as metal donors. It is also possible to use the freshly precipitated hydroxides. The reaction is carried out in a weakly acid to alkaline range. It is carried out for example with copper sulphate in aqueous medium in the presence of sodium acetate or ammonia or with copper nitrate in the presence of sodium carbonate in an organic medium, such as cellosolve.

Ordinarily the reaction is carried out with heating, e.g. at a temperature somewhat below the boiling point of the solvent used.

The novel dyes are suitable for dyeing and printing natural or synthetic polyamide materials, such as wool or especially nylon. The dyeing is carried out in aqueous dyebaths at pH values 4 to 8.

The dyeings obtained with the novel dyes are characterised by purity, depth and brilliance of shade. Their fastness properties, such as fastness to washing, rubbing, water, alkali and acid, are generally good and their light fastness is exceptional. The dyeings are also very level, since the novel dyes cover barriness on nylon well.

The invention is illustrated by the following Examples in which the parts are by weight. Also, in the following Examples, it is understood that the simple hexagon represents the benzene nucleus, the fused hexagons represent the naphthalene nucleus, the simple hexagon interrupted by N represents the pyridine nucleus and the hexagon interrupted by N and containing therein the symbol H represents the piperidine nucleus.

EXAMPLE 1

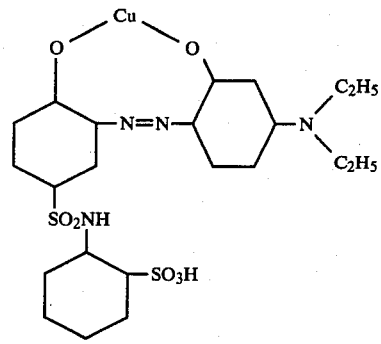

10.4 parts of the dye obtained by acid coupling of diazotised 2-amino-1-oxy-benzene-4-(2'-sulphonic acid)-sulphanilide with 3-diethylamino-1-oxybenzene are dissolved in 400 parts of water by addition of sodium hydroxide at pH 7 and the solution is heated to 70° C. A solution of 6 parts of copper sulphate crystals in 30 parts of water is added dropwise at 70°–75° C. and the pH is kept at 4–5 by addition of a 4 normal sodium acetate solution. Upon termination of the reaction, the completely precipitated dye is filtered off with suction and dried. The product is a red powder which dissolves in water to give a red solution and dyes polyamide and leather in a weakly acid bath in red shades of good fastness properties.

EXAMPLE 2

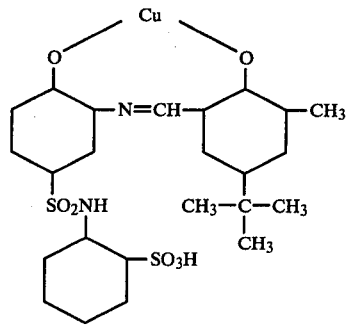

6.88 parts of 2-amino-1-oxybenzene-4-(2'-sulphonic-acid)-sulphanide and 3.85 parts of 6-methyl-4-tert. butylsalicylaldehyde and 6 parts of copper sulphate crystals are heated in 400 parts of water to 70°–75° C. and the pH is adjusted to 4.5 with sodium acetate. The reaction is terminated after the mixture has been stirred for 4 hours. The completely precipitated dye is isolated by filtration and then dried It is a yellow powder which dissolves in water to give a yellow solution and dyes polyamide and leather in a weakly acid bath in yellow shades of good fastness to light and wet treatments.

EXAMPLE 3

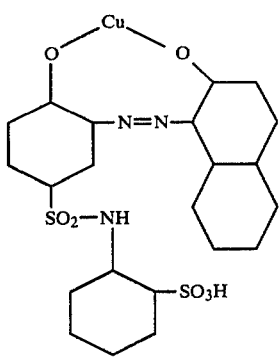

49.3 parts of the dye obtained by coupling diazotised 2-amino-1-oxybenzene-4-sulphanilide-2′-sulphonic acid with 2-naphthol are dissolved in 1000 parts of water. The solution is heated to 70° C. and adjusted to pH 5.0 with acetic acid. Upon additon of a solution of an amount of copper sulphate (containing 7 parts of copper) in 100 parts of water, the pH is adjusted to 4.5 by addition of sodium acetate and the reaction mixture is stirred for 1 hour at 70°–75° C. Upon termination of the reaction the dye is filtered off and dried. It is a dark red powder which dissolves in water to give a red solution and dyes polyamides in bluish red shades of ggood fastness properties.

Further dyes which also have good fastness properties are obtained in analogous manner by reacting the dyes of column I of the table with the metal atoms listed in column II in the ratio indicated in column III.

| I | II | III | Shade on polyamide |
|---|----|-----|--------------------|
| [structure] | Cu | 1:1 | reddish yellow |
| " | Ni | 1:1 | yellow |
| " | Cu | 1:1 | yellow |
| [structure] | | | |
| " | Ni | 1:1 | pale yellow |
| " | Co | 2:1 | yellow |
| [structure] | Cu | 1:1 | brown |
| [structure] | Cu | 1:1 | reddish violet |
| " | Ni | 1:1 | violet |

-continued
| I | II | III | Shade on polyamide |
|---|---|---|---|
| 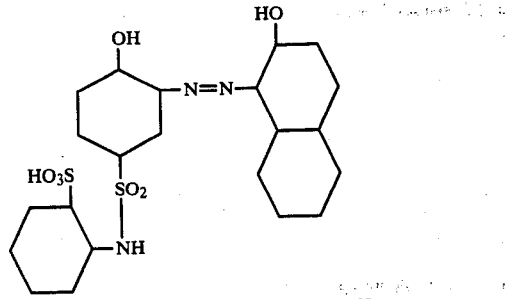 | Ni | 1:1 | yellowish claret |
| 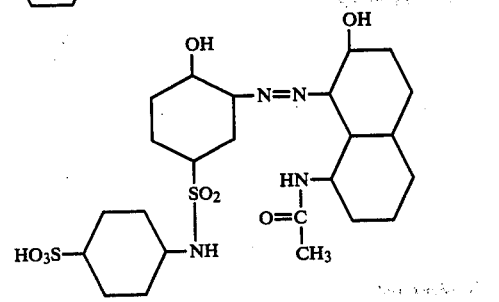 | Cu | 1:1 | violet |
| 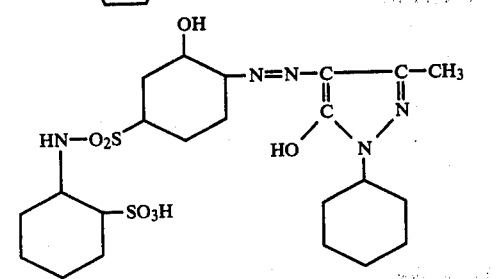 | Cu | 1:1 | orange |
| 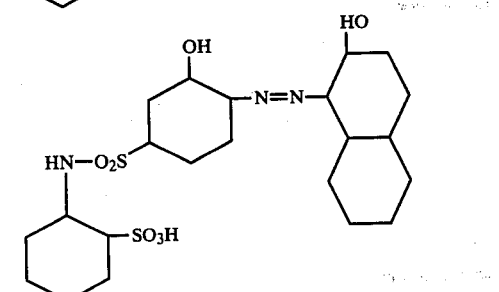 | Cu | 1:1 | bluish red |
| 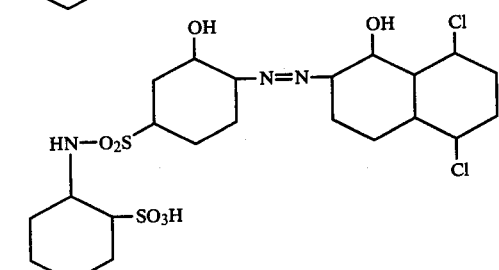 | Cu | 1:1 | violet |
| 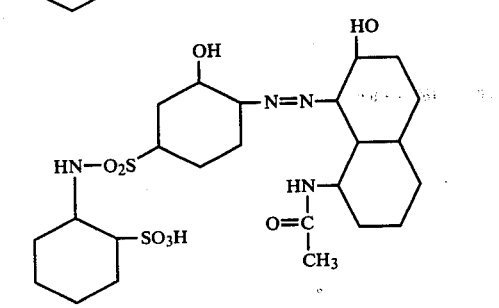 | Cu | 1:1 | bluish violet |

-continued
| I | II | III | Shade on polyamide |
|---|---|---|---|
| 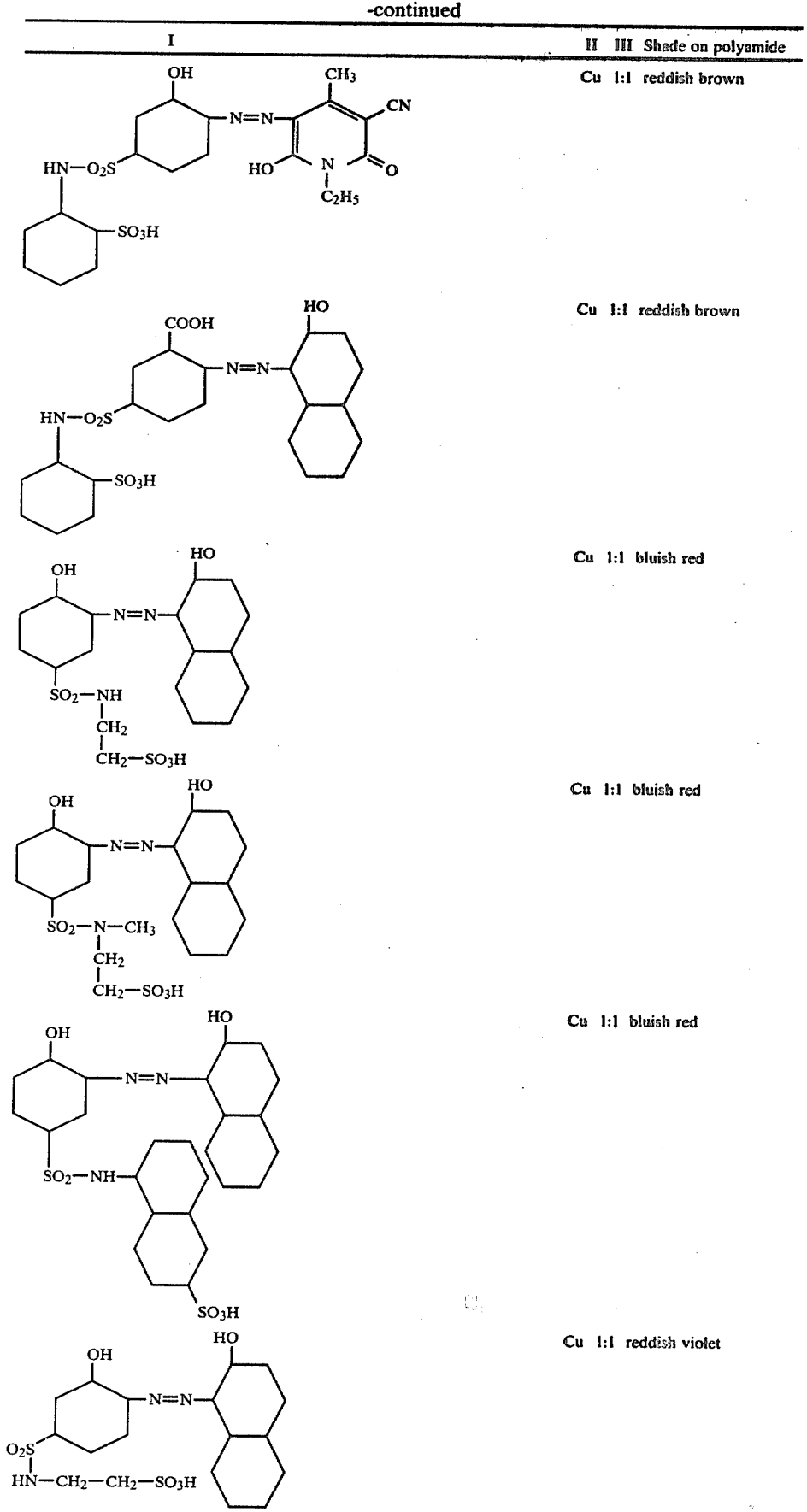 | Cu | 1:1 | reddish brown |
| | Cu | 1:1 | reddish brown |
| | Cu | 1:1 | bluish red |
| | Cu | 1:1 | bluish red |
| | Cu | 1:1 | bluish red |
| | Cu | 1:1 | reddish violet |

-continued
| I | II | III | Shade on polyamide |
|---|---|---|---|
| 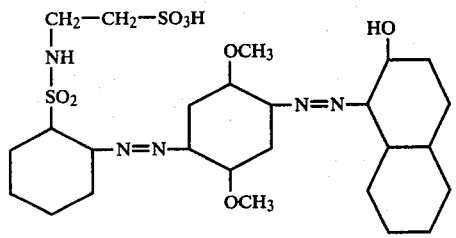 | Cu | 1:1 | greyish blue |
| 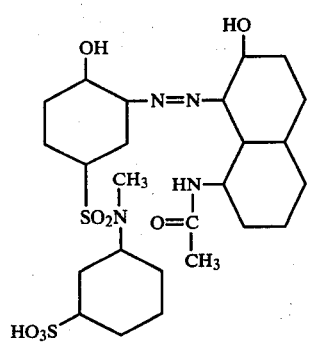 | Cu | 1:1 | violet |
| 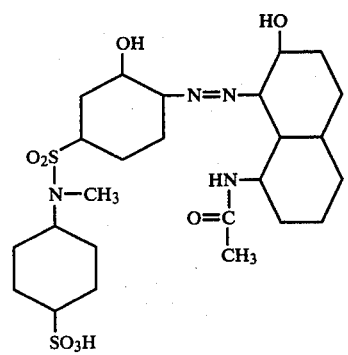 | Cu | 1:1 | violet |
| 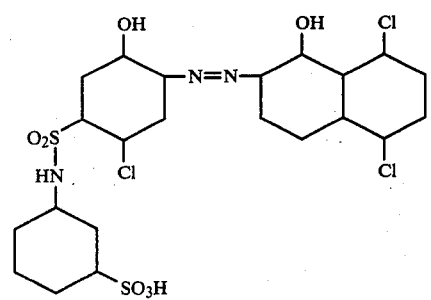 | Cu | 1:1 | bluish violet |
| 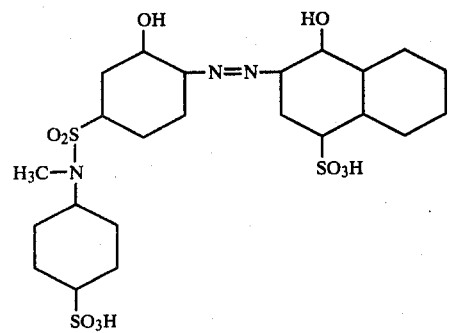 | Cu | 1:1 | violet |

| I | II | III | Shade on polyamide |
|---|---|---|---|
| (structure) | Cu | 1:1 | bluish violet |
| (structure) | Cu | 1:1 | yellow |
| (structure) | Cu | 1:1 | blue |
| (structure) | Cu | 1:1 | yellow |
| (structure) | Cu | 1:1 | yellow |
| " | Ni | 1:1 | golden yellow |
|   | Cu | 1:1 | reddish brown |

-continued

| I | II | III | Shade on polyamide |
|---|----|-----|---------------------|
| [structure: cyclohexyl-OH-N=N-pyridone with CN, CH3, N-C2H5, SO2-NH-cyclohexyl-SO3H] | Ni | 1:1 | orange |
| [structure: bis-cyclohexyl azo with OH, OH, fused benzene with N, SO2-NH-cyclohexyl-SO3H] | Cu | 1:1 | reddish orange |
| " | Ni | 1:1 | orange |
| [structure: bis-cyclohexyl N=N with two OH groups, C(CH3)3 and SO2-NH-cyclohexyl-SO3H(CH3)] | Cu | 1:1 | bluish red |
| " | Ni | 1:1 | brown |
| [structure: bis-cyclohexyl N=CH with OH, OH, N(C2H5)2, SO2-NH-cyclohexyl-SO3H] | Cu | 1:1 | yellow |
| [structure: bis-cyclohexyl N=N with OH, OH, N(C2H5)2, SO2NH-cyclohexyl-COOH] | Cu | 1:1 | yellowish red |
| " | Ni | 1:1 | red |
| " | Co | 2:1 | claret |

-continued

| I | II III Shade on polyamide |
|---|---|
| [structure: naphthol-azo-cyclohexane with OH, HNO₂S, SO₃H substituents] | Ni 1:1 red |
| [structure: cyclohexane-OH-azo-pyridine with NH₂, NH₂, CN, NH-cyclohexyl, SO₂NH-cyclohexane-SO₃H] | Cu 1:1 yellowish brown |
| " | Ni 1:1 reddish orange |
| " | Co 2:1 red |
| " | Cr 2:1 claret |
| " | Co 2:1 reddish brown |
| [structure: cyclohexane-OH-azo-pyridine with NH₂, NH₂, CN, NH-cyclohexyl, SO₂NH-cyclohexane-COOH] | Cu 1:1 orange |
| [structure: cyclohexane-OH-azo-pyridine with NH₂, NH₂, CN, N-piperidine (H), SO₂NH-cyclohexane-SO₃H] | |
| " | Ni 1:1 reddish orange |
| " | Co 2:1 scarlet |
| " | Cr 2:1 claret |
| " | Cu 1:1 orange |
| [structure: cyclohexane-OH-azo-pyridine with NH₂, NH₂, CN, HN-cyclohexyl, SO₃NH-CH₂-CH₂-SO₃H] | |
| " | Ni 1:1 orange |
| " | Cr 2:1 claret |
| " | Co 2:1 red |

-continued
| I | II | III | Shade on polyamide |
|---|---|---|---|
| 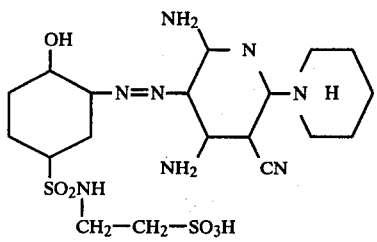 | Cu | 1:1 | orange |
| " | Ni | 1:1 | yellow orange |
| " | Cr | 2:1 | claret |
| " | Co | 2:1 | red |
| 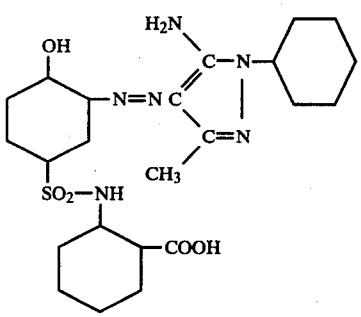 | Cu | 1:1 | greenish yellow |
| " | Ni | 1:1 | yellow |
| 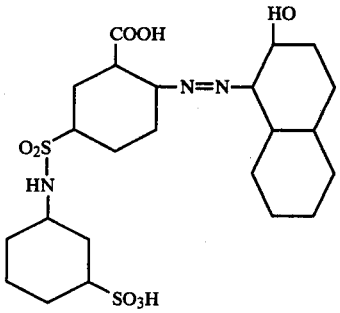 | Ni | 1:1 | brownish orange |
| 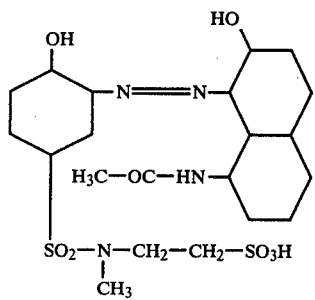 | Cu | 1:1 | violet |
| 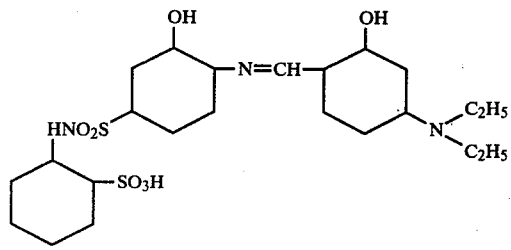 | Cu | 1:1 | yellow |

| -continued | | | |
|---|---|---|---|
| I | II | III | Shade on polyamide |
| [structure: cyclohexane-COOH with sulfone bridge to cyclohexane-COOH, azo-linked to decahydronaphthalene-OH] | Co | 2:1 | brown |
| [structure: cyclohexane with OH, HNO₂S, NH-cyclohexane-SO₃H, azo-linked to cyclohexane with OH, HO, N to decahydro ring] | Cu | 1:1 | reddish brown |
| [structure: cyclohexane with HO, SO₂NH-cyclohexane(HOOC), azo-linked to decahydronaphthalene with OH and HN-CO-CH₃] | Cu | 1:1 | violet |
| " | Ni | 1:1 | claret |
| [structure: cyclohexane with OH, HNO₂S, NH-cyclohexane-SO₃H, azo-linked to pyridone with CH₃, HO, N-C₂H₅, =O] | Ni | 1:1 | reddish orange |
| [structure: cyclohexane with OH, SO₂NH-cyclohexane-SO₃H, N=CH linked to cyclohexane with OH, C(CH₃)₃, CH₃-C(CH₃)-CH₃] | Cu | 1:1 | yellow |
| [structure: cyclohexane with SO₂NHCH₂-CH₂-SO₃H, azo-linked to cyclohexane with OCH₃, CH₃, azo-linked to decahydronaphthalene-OH] | Cu | 1:1 | reddish blue |

-continued

| I | II | III | Shade on polyamide |
|---|---|---|---|
| (structure) | Cu | 1:1 | grey |
| (structure) | Cu | 1:1 | brownish grey |
| (structure) | Cu | 1:1 | yellowish brown |
| (structure) | Cu | 1:1 | violet brown |
| (structure) | Cu | 1:1 | yellowish brown |
| (structure) | Cu | 1:1 | greenish blue |
| (structure) | Cu | 1:1 | red |

-continued

| I | II | III | Shade on polyamide |
|---|---|---|---|
| (structure) | Cu | 1:1 | orange |
| (structure) | Cu | 1:1 | yellow |
| " | Ni | 1:1 | yellow |
| (structure) | Ni | 1:1 | red |
| (structure) | Ni | 1:1 | reddish brown |
| " | Co | 2:1 | greenish grey |
| (structure) | Ni | 1:1 | reddish violet |

-continued

| I | II | III | Shade on polyamide |
|---|---|---|---|
| 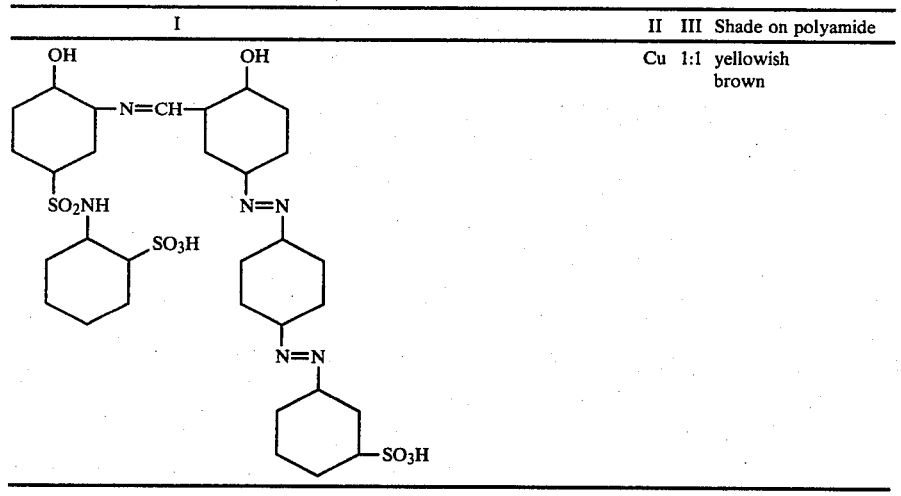 | Cu | 1:1 | yellowish brown |

We claim:
1. A copper or nickel complex dye of the formula

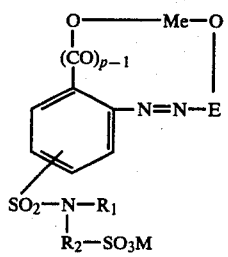

wherein
p is 1 or 2,
Me is copper or nickel,
$R_1$ is hydrogen or lower alkyl,
$R_2$ is lower alkylene or arylene,
M is hydrogen, an alkali metal or $NH_4$, and
E is ortho-coupled phenylene substituted by lower dialkylamino, lower alkylamino, or alkyl of 1 to 5 carbon atoms; and where arylene is napthylene or phenylene which is unsubstituted or substituted by chloro, lower alkyl or lower alkoxy.

2. A dye according to claim 1 of the formula

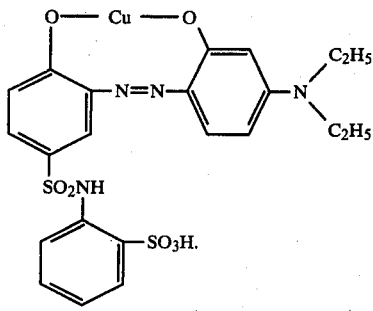

3. A dyestuff according to claim 1, of the formula

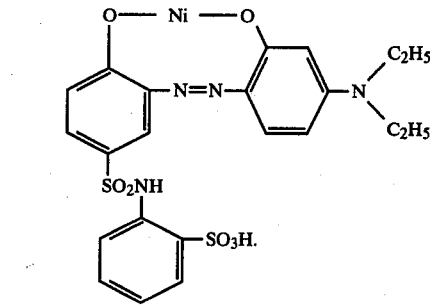

4. A dyestuff of the formula

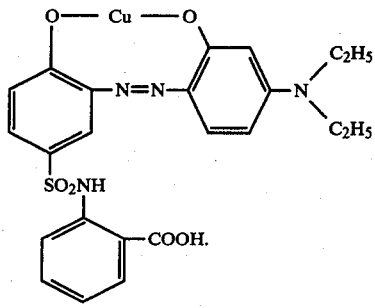

5. A dyestuff of the formula

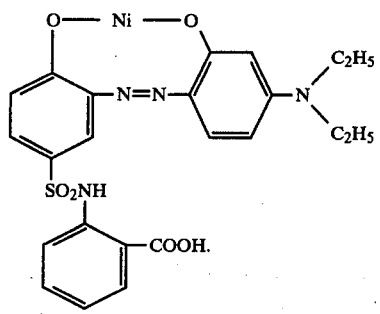

* * * * *